United States Patent [19]
Data

[11] Patent Number: 5,495,907
[45] Date of Patent: Mar. 5, 1996

[54] ENGINE DRIVEN GENERATOR SET SYSTEM HAVING SUBSTANTIALLY NO ROLL TORQUE

[75] Inventor: Stanley E. Data, Ramsey, Minn.

[73] Assignee: Onan Corporation, Minneapolis, Minn.

[21] Appl. No.: 481,183

[22] Filed: Jun. 7, 1995

Related U.S. Application Data

[63] Continuation of Ser. No. 92,134, Jul. 15, 1993, abandoned.

[51] Int. Cl.⁶ .................................................... B60K 1/00
[52] U.S. Cl. ........................ 180/65.2; 180/65.4; 310/51
[58] Field of Search ............................... 180/65.1, 65.2, 180/65.3, 65.4, 65.6, 65.6, 65.7, 165; 74/603, 606 R; 123/192.3; 60/715; 310/51, 12, 23

[56] References Cited

U.S. PATENT DOCUMENTS

| | | |
|---|---|---|
| 322,310 | 7/1885 | Miles . |
| 1,011,778 | 12/1911 | Harhorn . |
| 1,179,779 | 4/1916 | Uhl . |
| 1,749,883 | 11/1926 | Ledwinka . |
| 1,784,133 | 12/1930 | Decker . |
| 1,893,629 | 1/1933 | Masterson et al. . |
| 2,137,738 | 11/1938 | Faubion . |
| 2,153,523 | 4/1939 | Roberts et al. . |
| 2,256,035 | 9/1941 | Potter . |

(List continued on next page.)

FOREIGN PATENT DOCUMENTS

| | | |
|---|---|---|
| 637117 | 2/1962 | Canada . |
| 886890 | 11/1971 | Canada . |
| 920454 | 2/1973 | Canada . |
| 920455 | 2/1973 | Canada . |
| 920456 | 2/1973 | Canada . |
| 920457 | 2/1973 | Canada . |
| 920458 | 2/1973 | Canada . |
| 1210245 | 10/1970 | United Kingdom . |
| 1210246 | 10/1970 | United Kingdom . |
| 1210247 | 10/1970 | United Kingdom . |
| 1210248 | 10/1970 | United Kingdom . |
| 1210249 | 10/1970 | United Kingdom . |
| 1210250 | 10/1970 | United Kingdom . |

OTHER PUBLICATIONS

"The Vibrationless Engine" published in Automobile Engineer, Aug., 1970 (Exhibit A).
"How to Make Vibrationless Engines" by Victor Heron & Associates, 25 Colonial Crescent, Oakville, Ontario, Canada L6J 4K8 (Exhibit B).
Onan, "Onan MicroLite Gen Set Selling Guide" (2 pages), published 1989.
Onan, "Our Generators Keep Running, So you Won't Have To" (4 pages), published 1991.
Onan, "The Critical Link" (4 pages), published 1991.
Onan, "Keep Your Business On the Road" (4 pages), published 1990.
Onan, "Onan Emerald Plus RV–GenSets" (4 pages), published 1989.
Onan, "Introducing Cummins/Onan Quiet Site Generators" (4 pages), published 1990.
Onan, "Marquis GenSets" (6 pages), published 1990.
Onan, "Onan RV GenSets, Because You've Got Enough to Worry About on the Road" (6 pages), published 1988.
Onan, "Few Things Have Given Boaters, More Dependable Service than Onan" (4 pages), published 1988.
Onan, "Horizontal & Vertical Shaft" (8 pages), published 1987.
Onan, "Gasoline Engines" (6 pages), published 1988.
Onan, "Your Connection to Emergency/Standby Power" (6 pages), published 1991.

*Primary Examiner*—Richard M. Camby
*Attorney, Agent, or Firm*—Merchant, Gould, Smith, Edell, Welter & Schmidt

[57] ABSTRACT

An engine driven generator set system includes a generator which includes a rotor and a stator which rotate in opposite directions so that vibratory roll torques are eliminated during generator set operation.

17 Claims, 5 Drawing Sheets

U.S. PATENT DOCUMENTS

| | | |
|---|---|---|
| 2,383,996 | 9/1945 | Stucke . |
| 2,462,182 | 2/1949 | Guerdan et al. . |
| 2,564,741 | 8/1951 | Vermillion . |
| 2,955,750 | 10/1960 | Phelps . |
| 3,185,876 | 5/1965 | Broziat . |
| 3,842,287 | 10/1974 | Nakamura . |
| 4,056,746 | 11/1977 | Burtis . |
| 4,084,445 | 4/1978 | Erwin . |
| 4,098,252 | 7/1978 | Abthoff et al. . |
| 4,099,589 | 7/1978 | Williams . |
| 4,172,434 | 10/1979 | Coles . |
| 4,195,613 | 4/1980 | Bratt et al. . |
| 4,274,382 | 6/1981 | Sugasawa et al. . |
| 4,291,233 | 9/1981 | Kirschbaum . |
| 4,382,188 | 5/1983 | Cronin . |
| 4,425,989 | 1/1984 | Gotoda . |
| 4,489,695 | 12/1984 | Kohama et al. . |
| 4,496,020 | 1/1985 | Mitsuishi . |
| 4,535,744 | 8/1985 | Matsumura . |
| 4,538,481 | 9/1985 | Ohta et al. . |
| 4,556,026 | 12/1985 | Masuda et al. . |
| 4,608,952 | 9/1986 | Morita et al. . |
| 4,628,876 | 12/1986 | Fujikawa et al. . |
| 4,699,097 | 10/1987 | Tanaka et al. . |
| 4,722,308 | 2/1988 | Wall . |
| 4,900,992 | 2/1990 | Sekizawa . |
| 4,958,095 | 9/1990 | Uchida et al. . |
| 4,963,804 | 10/1990 | Geiger . |
| 4,984,480 | 1/1991 | Gormley . |
| 5,034,638 | 7/1991 | McCabria . |
| 5,038,731 | 8/1991 | Shimada . |
| 5,057,725 | 10/1991 | Kasai et al. . |
| 5,057,726 | 10/1991 | Mole et al. . |
| 5,087,230 | 2/1992 | Yates et al. . |
| 5,105,776 | 4/1992 | Tsuchiya et al. . |
| 5,121,715 | 6/1992 | Nogami et al. . |
| 5,172,784 | 12/1992 | Varela, Jr. ........................ 180/65.4 |
| 5,214,358 | 5/1993 | Marshall ........................... 180/65.4 |
| 5,264,764 | 11/1993 | Kuang ............................... 180/65.4 |

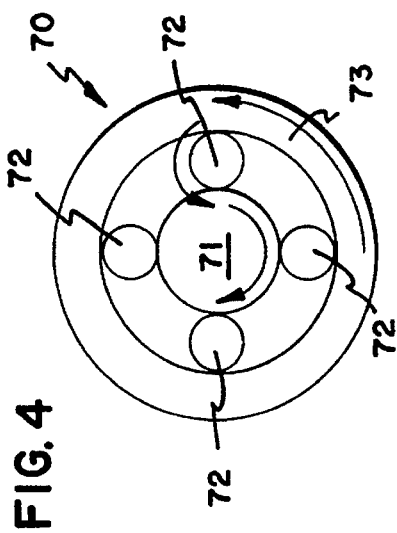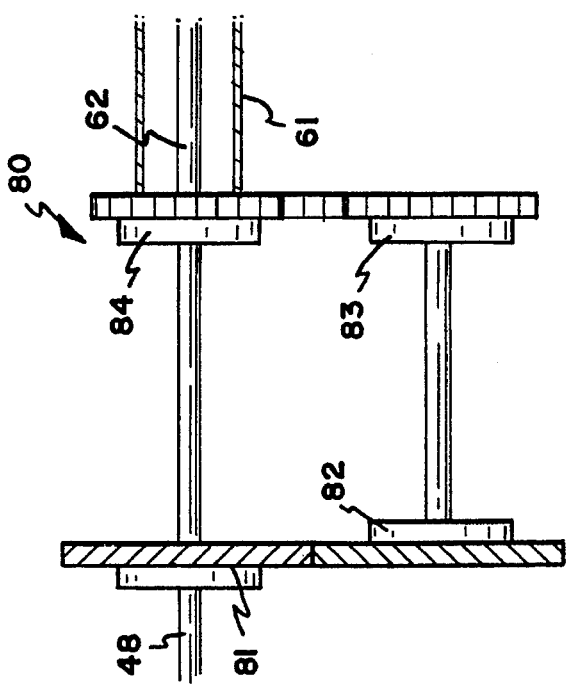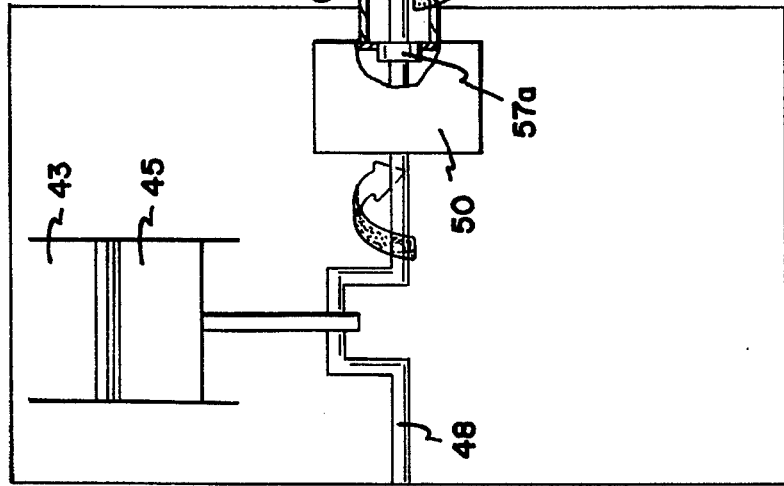

ENGINE DRIVEN GENERATOR SET SYSTEM HAVING SUBSTANTIALLY NO ROLL TORQUE

This is File Wrapper Continuation application of application Ser. No. 08/092,134, filed Jul. 15, 1993, abandoned.

BACKGROUND OF THE INVENTION

The present invention relates to an engine driven generator set system that does not exert any roll torque on its mounting structure. More particularly, the present invention relates to reduction or elimination of vibratory roll torques of an engine driven generator set system wherein the rotor and the stator are rotated in opposite directions.

The present invention applies to generator sets having rotating parts which are subject to vibratory roll torques caused by transient or cyclic electrical loads, starting torques and shutdown torques, cyclic combustion torques, etc. The present invention also applies to various applications where generators/alternators are used; for example, alternators for automobile engines, auxiliary power units for hybrid electric vehicles, etc.

Engine driven generator set systems have been commercially manufactured and marketed for several decades. An engine driven generator set system that imparts no vibratory torque on its mounting structure is desirable because vibrations cause mechanical damage, human discomfort, etc.

In engine driven generator set systems, particularly piston engine generator systems, vibrations occur in the engine from various causes. One major cause of these vibrations is roll torque. The vibratory roll torque is caused by the successive firing of the cylinders. The successive explosions in the cylinders, which push the pistons down and meanwhile turn the crankshaft, act also on each of the cylinders and the engine which results in net roll torques being transmitted to the engine supporting structure which causes vibration.

The aforementioned roll torque can be reduced by making engines with many cylinders. However, many engine driven generator sets are required to be small size, light weight, and low cost so that the engine driven generator set is often made with a few cylinders.

To deal with the above vibrations, a single cylinder engine-generator set is disclosed by Canadian Patent No. 920454, issued on Feb. 6, 1974, to Victor Heron. In the Canadian patent, a rotor is mounted on an end of a crankshaft of the engine, and a pair of counter-rotating balance shafts with fly wheels, which are disposed side-by-side and parallel to the crankshaft of the engine, are driven by two gears which are coupled with a gear on the crankshaft. A plurality of flywheels and counterweights are disposed on the balance shafts and the crankshaft, respectively. When the engine and generator are running, the net angular momentum of its rotating parts are zero resulting in no net roll torque. Accordingly, sudden angular accelerations caused by cylinder firing cause no movement in the supporting structure of the engine and generator. However, the balance shafts and flywheels can result in unacceptably large and costly generator sets.

The present invention relates to a generator set having no net roll torque which can be optimized for very low noise, small package size, low cost, and/or increased power density requirements.

SUMMARY OF THE INVENTION

The present invention relates to a generator set having no net roll torque which can be optimized for very low noise, small package size, low cost, and/or increased power density requirements.

One embodiment of a generator set in accordance with the principles of the present invention includes a generator having its rotor and stator mounted on counter rotating, concentric shafts so as to provide a generator set having no net angular momentum.

Another embodiment of a generator set in accordance with the principles of the present invention comprises:
a combustion engine;
a first generator drive shaft driven by the combustion engine;
a second generator drive shaft concentrically disposed relatively to the first generator drive shaft;
counter rotating connector means for rotating the first and second generator drive shafts in opposite directions;
a generator having a rotor and a stator, the rotor and the stator being disposed on the first and second generator drive shafts for rotation in opposite directions, a net angular momentum of the generator set being substantially zero thereby eliminating any net roll torque.

In one embodiment, the first and second generator drive shafts are mounted to gear means, such as a set of bevel gears, so as to allow the first and second generator drive shafts to rotate in opposite directions.

One advantage of one embodiment of the present invention is that the net vibratory roll torques are eliminated.

Another advantage of one embodiment of the present invention is that the opposite rotation of the rotor and stator significantly increases the power density of the generator. For example, a reduced sized generator set can produce the same power as a larger generator having a stationary stator.

Still another advantage of one embodiment of the present invention is that the cost of meeting low level noise requirements is reduced.

In addition, the present invention can be used in an auxiliary power system in a hybrid electric vehicle. Such an auxiliary power system would include a combustion engine, a generator having a stator and rotor mounted on counter rotating generator drive shafts driven by the combustion engine, and a battery system charged by the generator.

These and various other advantages and features of novelty, which characterize the invention are pointed out with particularity in the claims annexed hereto and forming a part hereof. However, for a better understanding of the invention, its advantages and objects obtained by its use, reference should be had to the drawings which form a further part hereof, and to the accompanying descriptive matter, in which there is illustrated and described a preferred embodiment of the invention.

BRIEF DESCRIPTION OF THE DRAWINGS

In the drawings, in which like reference numerals and letters indicate corresponding parts throughout the several views:

FIG. 2 is a partial schematic view illustrating a first and second concentric generator drive shafts connected to the crank shaft by a suitable connection assembly for counter rotation relative to each other, the stator and rotor of the generator being mounted on the first and second drive shafts such that the stator and rotor rotate in opposite directions;

FIG. 4 is a sectional view of a planetary gear arrangement connecting the first and second generator drive shafts to the crank shaft;

FIG. 5 is a sectional view of a drive chain arrangement connecting the first and second generator drive shafts to the crank shaft;

DETAILED DESCRIPTION OF THE PREFERRED EMBODIMENT

Figure 1:
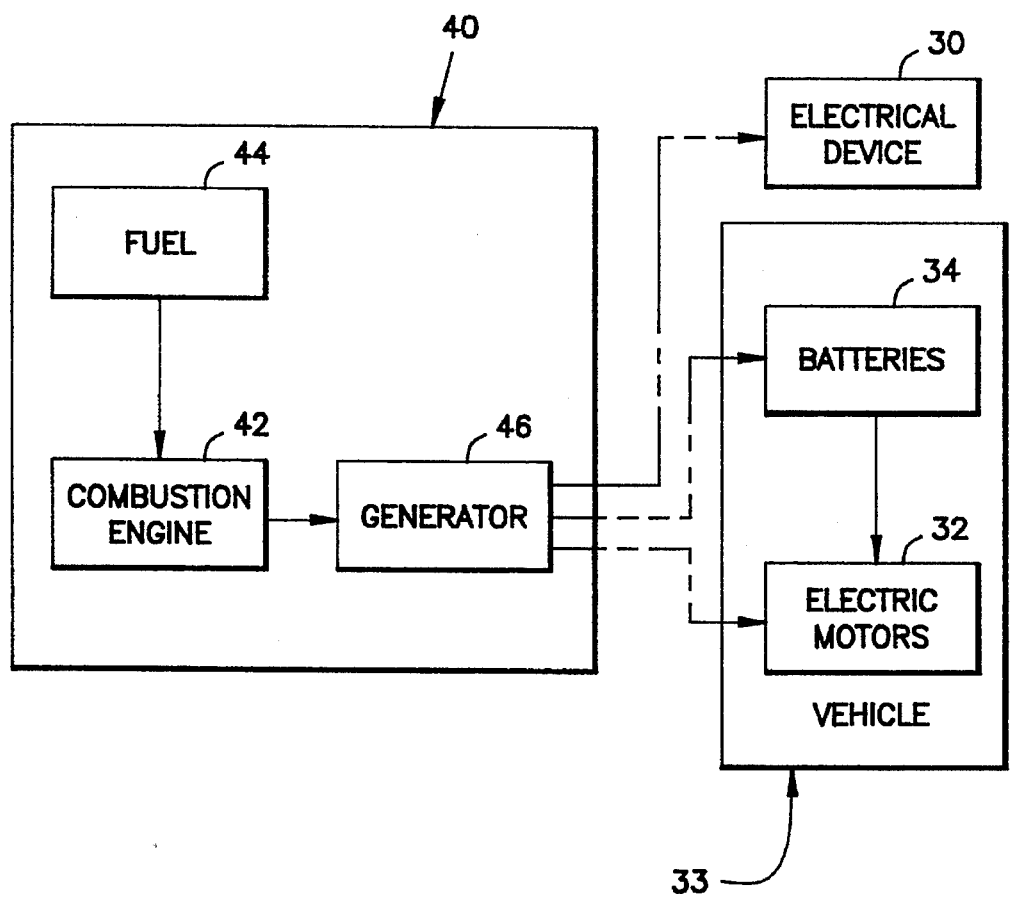
FIG. 1 is a block diagram of an engine driven generator set system in accordance with the present invention having no net roll torque, used as a power supply for various electrical devices.

In FIG. 1, there is shown that an engine driven generator set 40, generally in accordance with the principles of the present invention, is used as a power supply for various electrical devices. An output of the engine driven generator set 40 might be electrically connected to an electrical device 30. When used in a hybrid electric vehicle 33, an output of the generator set 40 might be electrically connected to an electric motor 32 of the vehicle or batteries 34 used to power the vehicle. The engine driven generator set 40 includes a combustion engine 42, which uses fuel 44 as an energy source to rotate a crankshaft 48 by operation of pistons 45 and cylinders 43, and a generator 46, which mechanically connects to the combustion engine 42 and converts the mechanical energy of the crankshaft 48 into electrical energy. It will be appreciated that a generator designed in accordance with the principles of the present invention might have numerous applications and uses.

FIG. 2 shows a schematic view of the engine driven generator set 40. A connection assembly 49 is illustrated interconnecting concentric, first and second generator drive shafts 61,62 to the crankshaft 48 so the first and second generator drive shafts 61,62 are counter rotating relative to one another. A rotor 63 is mounted on the first generator drive shaft 61 for rotation therewith and a stator 64 is mounted on the second generator drive shaft 62 for rotation therewith such that the generator rotor 63 and stator 64 rotate in opposite directions. The rotor 63 and stator 64 are provided with an angular momentum such that the net angular momentum of the generator set system rotating parts is zero. This results in zero net roll torque which eliminates any vibration of the engine driven generator set due to net roll torque.

Figure 3:
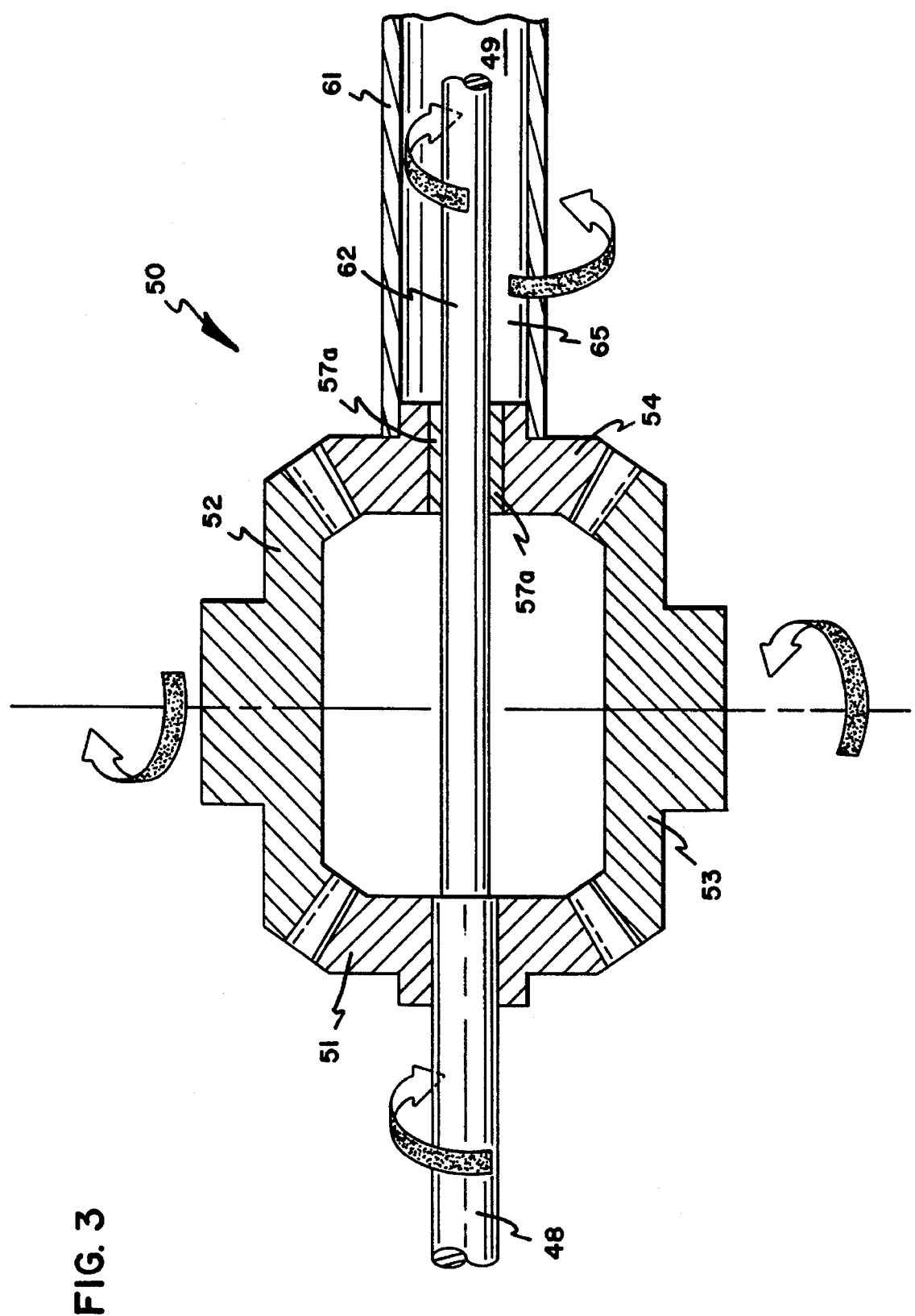
FIG. 3 is a cross-sectional view of a bevel gear arrangement connecting the first and second generator drive shafts to the crank shaft.

It will be appreciated that any number of connection assemblies might be utilized for connecting the first and second generator drive shafts to the crank shaft.. In FIGS. 3 through 5, embodiments of a bevel gear assembly, a planetary gear assembly, and a chain drive assembly are shown. These are but some of the various connection assemblies which might be used in keeping with the principles of the present invention..

A bevel gear assembly 50 is shown in FIG. 3. Two idler bevel gears 52,53 are coupled with a bevel gear 51. Direction arrows show that two idler bevel gears 52,53 are rotated in opposite directions so that a bevel gear 54, which is at the opposite side of the bevel gear 51, rotates in the opposite direction of the bevel gear 51. The four bevel gears 51,52,53,54 form the bevel gear assembly 50. The bevel gears 51 and 54 rotate at the same speed and in opposite directions, and the bevel idler gears 52 and 53 rotate at the same speed and in opposite directions.

The bevel gear 54 has a bearing arrangement 57a through which the second generator drive shaft 62 extends and is supported. The stator 64 of the generator 46 is mounted on the other end of the second generator drive shaft 62 so that the stator 64 rotates in the same direction as the second generator drive shaft 62. The second generator drive shaft 62 is further supported at a second end by a bearing arrangement 57b. The two bearing arrangements 57a,b facilitate alignment of the first generator drive shaft 61 with the second generator drive shaft 62.

The bevel gear 54 is mounted on one end of the first generator drive shaft 61 so that the bevel gear 54 and the first generator drive shaft 61 rotate in the same direction. The rotor 63 of the generator 46 is mounted on the other end of the first generator drive shaft 61 so that the rotor 63 rotates with the first generator drive shaft 61. Accordingly, the rotor 63 and the stator 64 rotate in opposite directions. The inertia of the rotor 63 and the stator 64 can be designed so a net angular momentum of the generator set is zero. Thus, the net vibratory roll torques are eliminated. Weights and counter weights can be placed on the first and second generator drive shafts 61,62, respectively, to further balance the vibrations thereon.

The first generator drive shaft 61 has a bore 65 which allows the second generator drive shaft to pass concentrically therethrough and attach to the stator 64. It is appreciated that the use of additional flywheels is not necessary for the present invention to have zero net angular momentum.

FIG. 4. illustrates use of a planetary gear assembly 70 as the connection assembly 50 connecting the first and second generator drive shafts 61,62 to the crankshaft 48. The gear assembly 70 is shown as having a crank shaft gear 71 mounted on the crankshaft 48 for rotation therewith. A plurality of planetary gears 72 are illustrated disposed about the crank shaft gear 71. The planetary gears 72 rotate about their respective stationary axes of rotation. A ring gear 73 is connected to the planetary gears 72 such that the ring gear 73 rotates in a direction opposite that of the crank shaft gear 71. The first generator drive shaft 61 might be connected to the ring gear 73 and the second generator drive shaft 62 might be connected to the crank shaft 48 such that the first and second generator drive shafts 61,62 rotate in opposite directions. It will be appreciated that the assembly 70 might take on varying configurations and yet be in keeping with the principles of the present invention.

FIG. 5 illustrates a chain drive assembly 80 as the connection assembly connecting the first and second generator drive shafts 61,62 to the crank shaft 48 such that the first and second generator drive shafts 61,62 rotate in opposite directions. In the embodiment shown, a drive gear 81 is mounted on the crankshaft 48 for rotation therewith. The gear 81 meshes with a second drive gear 82. The drive gear 82 is connected to a chain drive sprocket 83 by a common shaft so that the chain drive sprocket 83 rotates in the same direction as the drive gear 82. The chain drive sprocket 83 is connected by a chain to a chain drive sprocket 84. The chain drive sprocket 84 has an aperture to allow passage of the second generator drive shaft 62 therethrough. A suitable bearing assembly will be provided to provide bearing support between the chain drive sprocket 84 and the second generator drive shaft 62. The chain drive sprocket 84 is connected to the first generator drive shaft 61 to cause rotation thereof in a direction opposite that of the second generator drive shaft 62. It will be appreciated that the assembly 80 might take on varying configurations and yet be in keeping with the principles of the invention.

The counter-rotation of the rotor 63 and the stator 64 produces a significant increase in air gap velocity as compared to the stator 64 being stationary so as to increase the power density of the generator.

Figure 6:
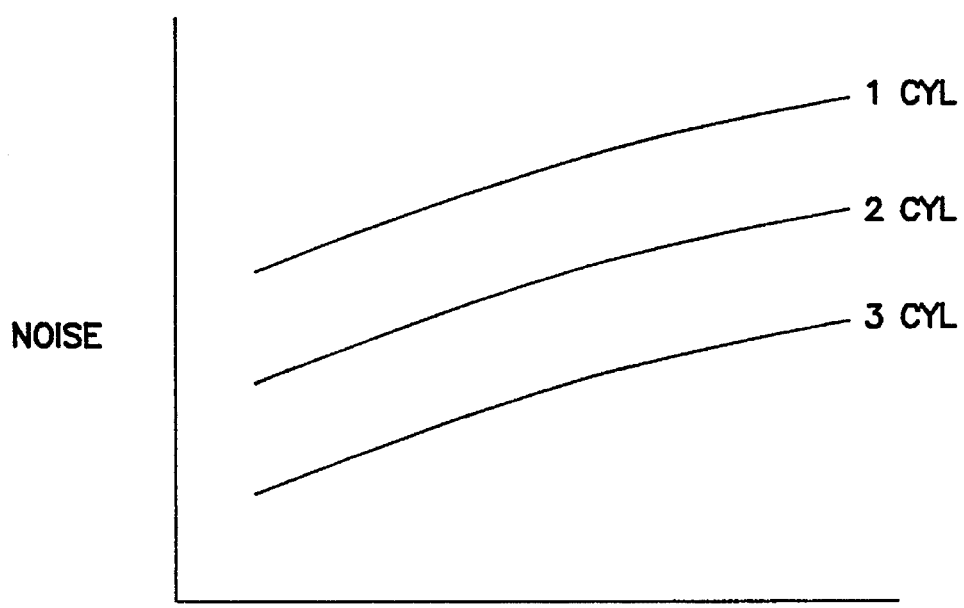
FIGS. 6–8 are illustrative graphs illustrating a comparison of noise, cost, and size parameters versus speed and number of engine cylinders for a given generator power output.
Figure 7:
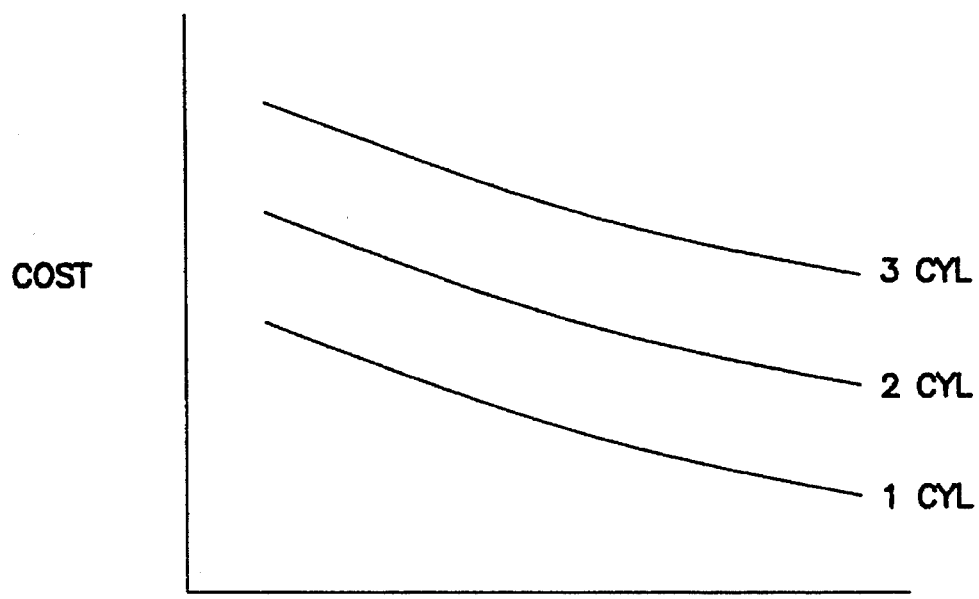
Figure 8:
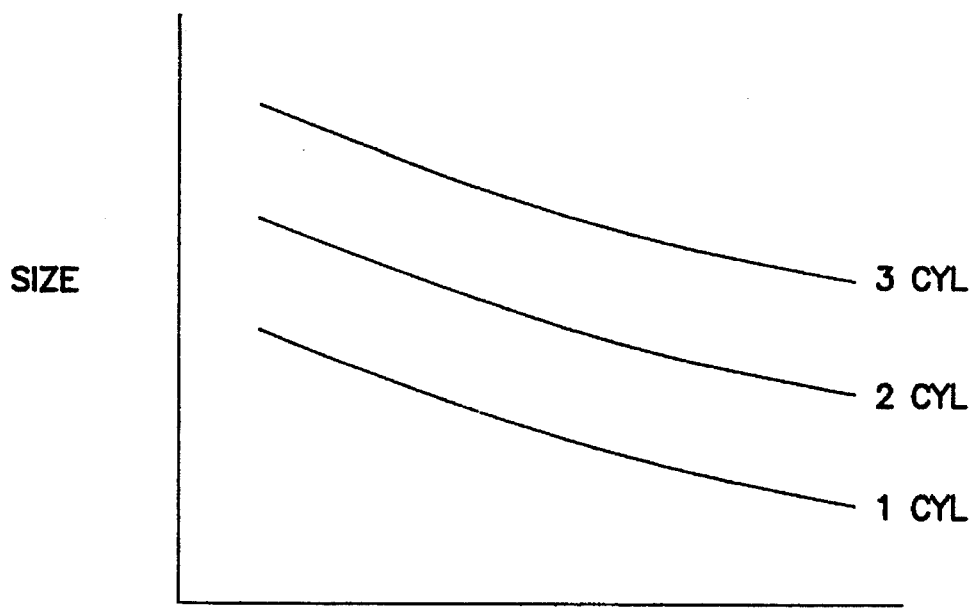
Figure 9:
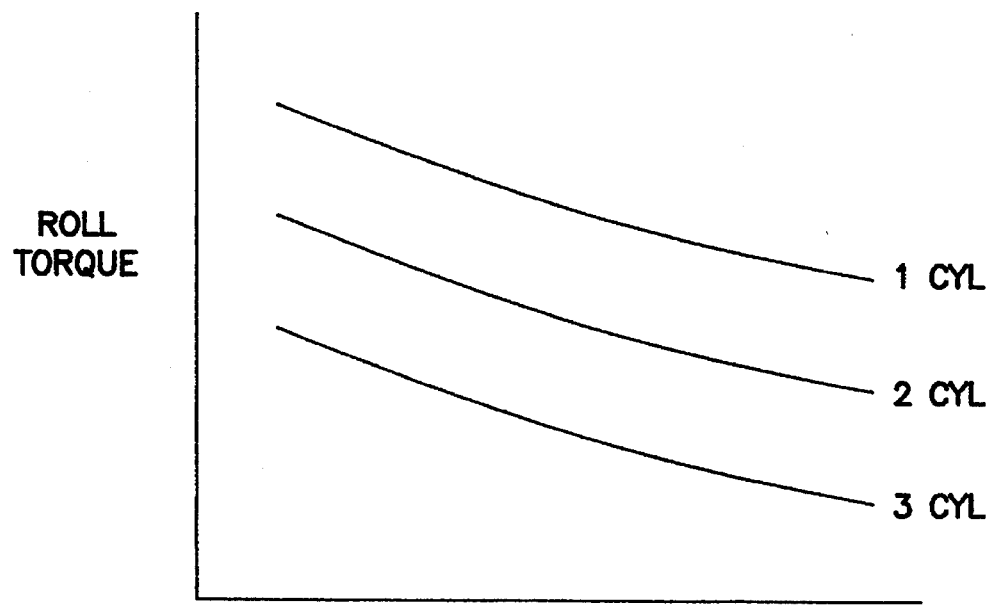
FIG. 9 is an illustrative graph illustrating a comparison of roll torque versus speed and number of engine cylinders for a given generator power output.

The present invention can be optimized to obtain the desired noise, cost, and size parameters while exhibiting zero net roll torque. Illustrated in FIGS. 6–8 are graphs showing the relative relationship between such parameters as noise, cost, and size relative to speed or revolutions per minute (RPM) and the number of cylinders present in the combustion engine of a generator set producing the same general power output. As illustrated in FIG. 9, with conventional generator sets, the net roll torque is increased as the speed is slowed down., In the present invention, there is zero net roll torque so this will not change as the speed parameter is changed. Accordingly, the generator set can be slowed down and there will be no increase in noise due to vibrations caused by roll torque. This allows for much more optimization of the size, cost, and noise parameters.

It will be appreciated that any number of cylinders can be used in the engine driven generator set 40. Moreover, since the roll torques are eliminated, any number of cylinders can be activated or deactivated while the engine is running without any noticeable change in vibrations due to net roll torque as the net roll torque remains zero.

The output of the generator 46 can be either a direct current (DC) or alternating current (AC).

The engine driven generator set 40 can be used as an auxiliary power supply system in a hybrid electric vehicle 33 (see FIG. 1). When the batteries 34 need charging, the engine driven generator set 40 charges the batteries 34. Minimal vibrations are produced during the use of the engine driven generator set 40 because there is zero net roll torque. Accordingly, an operator of the vehicle would not be able to detect the noise of the generator set 40 over the normal background noise generated by vehicle movement.

It is to be understood, however, that even though numerous characteristics and advantages of the present invention have been set forth in the foregoing description, together with details of the structure and function of the invention, the disclosure is illustrative only, and changes may be made in detail, especially in matters of shape, size and arrangement of parts within the principles of the invention to the full extent indicated by the broad generally meaning of the terms in which the appended claims are expressed.

What is claimed is:

1. A generator set comprising an engine-driven generator for converting fuel to electricity, the generator including a rotor and a stator which are mounted on counter rotating, concentric shafts, angular momentum of the rotor and the stator being selected to provide the generator set with substantially no net angular momentum.

2. A generator set comprising:

a combustion engine;

a first generator drive shaft driven by the combustion engine;

a second generator drive shaft concentrically disposed relative to the first generator drive shaft;

connector means for rotating the first and second generator drive shafts in opposite directions;

a generator having a rotor and a stator, the rotor and the stator being mounted on the first and second generator drive shafts for rotation in opposite directions, a net angular momentum of the generator set being substantially zero thereby eliminating any net roll torque.

3. A generator set in accordance with claim 2, wherein the connector means incudes a plurality of bevel gears coupling between each other, a first bevel gear being mounted on a crankshaft driven by the combustion engine for rotation with the crankshaft, second and third bevel gears, which are coupled with the first bevel gear, being rotated in opposite directions relative to each other, and a fourth bevel gear, which is coupled with the second and the third bevel gears, the fourth bevel gear being rotated in an opposite direction of the first bevel gear.

4. A generator set in accordance with claim 2, wherein the first and second generator drive shafts are rotated at a same speed.

5. A generator set in accordance with claim 2, wherein the connector means includes a planetary gear assembly.

6. A generator set in accordance with claim 2, wherein the connector means includes a chain drive assembly.

7. A generator set in accordance with claim 2, wherein spaced apart bearing means are disposed along the first and second generator drive shafts more concentrically aligning the first and second generator shafts relative to each other.

8. A generator set in accordance with claim 2, wherein the rotor is rotated within the stator.

9. A generator set in accordance with claim 2, wherein the combustion engine includes a plurality of cylinders.

10. A generator set in accordance with claim 9, wherein any cylinder can be deactivated without any additional vibratory roll torques.

11. A generator set in accordance with claim 2, wherein the second generator drive shaft extends concentrically through the center of the first generator drive shaft.

12. A generator set in accordance with claim 2, wherein the generator is a DC generator.

13. A generator set in accordance with claim 2, wherein the generator is an AC generator.

14. A generator set in accordance with claim 2, wherein the first and second generator drive shafts are rotated at a different speed.

15. A hybrid electric vehicle having an engine driven generator set as an auxiliary power unit, comprising:

a battery assembly providing electricity to the hybrid electric vehicle, the battery assembly being electrically connected to an electric motor of the hybrid electric vehicle;

the engine driven generator set electrically connected to the battery assembly for charging the battery assembly when the battery assembly needs charging; and wherein the engine driven generator set system includes a generator having its rotor and stator mounted on counter rotating, concentric shafts so as to provide an auxiliary power unit having substantially no net angular momentum.

16. A generator set comprising an engine-driven generator for converting fuel to electricity, the generator includes a rotor which is mounted on a first rotating shaft and stator which is mounted on a second shaft concentrically disposed with respect to the first shaft and rotating in an opposite direction with respect to the first shaft, angular momentum of the rotor and stator being selected to provide the generator set with substantially no net angular momentum.

17. A method of operating an engine-driven generator set, comprising the steps of:

rotating a rotor mounted on a first shaft in a first direction;

rotating a stator mounted on a second shaft concentrically disposed with respect to the first shaft in an opposite direction; and providing the rotor and stator each with an angular momentum to provide the generator set with substantially no net angular momentum.

\* \* \* \* \*